United States Patent
Thelen et al.

(10) Patent No.: US 7,686,365 B2
(45) Date of Patent: Mar. 30, 2010

(54) PICKUP BOX SIDE MODULE

(75) Inventors: John L. Thelen, Lake Orion, MI (US); Kevin R. Smith, Plymouth, MI (US)

(73) Assignee: Magna International Inc., Aurora, Ontario (CA)

( * ) Notice: Subject to any disclaimer, the term of this patent is extended or adjusted under 35 U.S.C. 154(b) by 232 days.

(21) Appl. No.: 11/744,498

(22) Filed: May 4, 2007

(65) Prior Publication Data

US 2007/0267885 A1  Nov. 22, 2007

Related U.S. Application Data

(60) Provisional application No. 60/798,093, filed on May 5, 2006.

(51) Int. Cl.
*B60R 9/02* (2006.01)

(52) U.S. Cl. .................. 296/37.6; 220/480; 224/404; 296/24.45; 296/181.3

(58) Field of Classification Search ............. 224/402, 224/403, 404; 296/24.3, 24.4, 24.44, 24.45, 296/37.1, 37.6, 39.2, 181.3, 183.1; 220/4.28, 220/254.1, 254.3, 476, 480, 481, 529
See application file for complete search history.

(56) References Cited

U.S. PATENT DOCUMENTS

| | | | | |
|---|---|---|---|---|
| D92,009 S | * | 4/1934 | Larsen | D12/96 |
| 2,173,112 A | * | 9/1939 | Hawkins | 296/37.6 |
| D143,992 S | * | 2/1946 | Powers | D12/96 |
| D148,021 S | * | 12/1947 | Holan, Jr. et al. | D12/96 |
| D148,541 S | * | 2/1948 | Holan, Jr. et al. | D12/99 |
| 2,455,417 A | * | 12/1948 | Holan et al. | 296/37.6 |
| 2,504,222 A | * | 4/1950 | Otto | 296/24.45 |
| 2,530,578 A | * | 11/1950 | Hotop | 296/24.32 |
| 2,616,754 A | * | 11/1952 | Stahl | 296/183.1 |
| 2,711,343 A | * | 6/1955 | Falk et al. | 49/205 |
| 2,722,352 A | * | 11/1955 | Dehnel | 224/404 |
| 2,878,955 A | * | 3/1959 | Hagan | 220/3.9 |
| 2,978,153 A | * | 4/1961 | Brindle | 224/541 |
| 3,068,038 A | * | 12/1962 | Douglass, Jr. | 296/37.6 |
| 3,245,713 A | * | 4/1966 | Ogilvie | 296/37.6 |
| 3,326,595 A | * | 6/1967 | Ogilvie | 296/37.6 |
| 3,492,042 A | * | 1/1970 | Nachtigall, Jr. | 296/24.45 |
| 3,596,976 A | * | 8/1971 | Eitel et al. | 212/181 |
| 3,722,946 A | * | 3/1973 | Cary | 296/165 |
| 3,727,971 A | * | 4/1973 | Sisler | 296/37.6 |
| 3,799,605 A | * | 3/1974 | Silva | 296/165 |
| 4,126,349 A | * | 11/1978 | Nelson et al. | 296/37.6 |
| 4,135,761 A | * | 1/1979 | Ward | 296/37.6 |
| 4,384,663 A | * | 5/1983 | Smith-Williams | 224/42.31 |
| 4,522,442 A | * | 6/1985 | Takenaka | 296/37.1 |

(Continued)

FOREIGN PATENT DOCUMENTS

JP  03079478 A  *  4/1991

*Primary Examiner*—Glenn Dayoan
*Assistant Examiner*—Paul A Chenevert
(74) *Attorney, Agent, or Firm*—Warn Partners P.C.

(57) ABSTRACT

A storage module having at least one exterior panel of a motorized vehicle, at least one door, and at least one inner panel. The door is at least partially formed by at least one of the exterior panels. At least one of the exterior panels and at least one of the interior panels define at least one area to form the storage module.

20 Claims, 6 Drawing Sheets

U.S. PATENT DOCUMENTS

| | | | |
|---|---|---|---|
| 4,632,446 A * | 12/1986 | Douglass | 296/37.6 |
| 4,685,695 A * | 8/1987 | LeVee | 280/441.2 |
| 4,917,430 A * | 4/1990 | Lawrence | 296/37.6 |
| 4,971,092 A * | 11/1990 | Parry et al. | 137/351 |
| 5,188,414 A * | 2/1993 | Burnham et al. | 296/37.6 |
| 5,267,773 A * | 12/1993 | Kalis et al. | 296/183.1 |
| 5,303,795 A * | 4/1994 | Buell | 180/219 |
| 5,316,358 A * | 5/1994 | Payne et al. | 296/37.6 |
| 5,383,703 A * | 1/1995 | Irvine, III | 296/24.45 |
| 5,421,645 A * | 6/1995 | Young | 312/108 |
| 5,567,000 A * | 10/1996 | Clare | 296/37.6 |
| 5,615,922 A * | 4/1997 | Blanchard | 296/37.6 |
| 5,660,427 A * | 8/1997 | Freeman et al. | 296/190.08 |
| 5,667,268 A * | 9/1997 | Bump | 296/37.6 |
| 5,784,769 A * | 7/1998 | Clare | 29/401.1 |
| 5,819,390 A * | 10/1998 | Clare | 29/430 |
| 5,823,598 A * | 10/1998 | Clare et al. | 296/37.6 |
| 5,826,931 A * | 10/1998 | Perlman et al. | 296/37.6 |
| 5,895,086 A * | 4/1999 | Carico | 296/37.6 |
| 5,941,589 A * | 8/1999 | Perlman et al. | 296/37.6 |
| 5,979,617 A * | 11/1999 | Clare et al. | 188/322.12 |
| 5,979,973 A * | 11/1999 | Clare et al. | 296/187.12 |
| 6,007,130 A * | 12/1999 | Clare et al. | 296/37.6 |
| 6,012,754 A * | 1/2000 | Clare et al. | 296/37.6 |
| 6,030,018 A * | 2/2000 | Clare et al. | 296/37.6 |
| 6,033,002 A * | 3/2000 | Clare et al. | 296/3 |
| 6,059,341 A * | 5/2000 | Jensen et al. | 296/37.6 |
| 6,089,639 A * | 7/2000 | Wojnowski | 296/37.6 |
| 6,102,474 A * | 8/2000 | Daley | 296/76 |
| 6,129,401 A * | 10/2000 | Neag et al. | 296/37.6 |
| 6,131,981 A * | 10/2000 | Finley | 296/37.6 |
| 6,139,081 A * | 10/2000 | Lemieux | 296/37.7 |
| 6,142,549 A * | 11/2000 | Clare et al. | 296/37.6 |
| 6,237,211 B1 * | 5/2001 | Clare et al. | 29/434 |
| 6,328,365 B1 * | 12/2001 | Adsit | 296/37.6 |
| 6,439,634 B1 * | 8/2002 | Jensen et al. | 296/37.6 |
| 6,485,077 B1 * | 11/2002 | Foster et al. | 296/37.1 |
| 6,499,795 B2 * | 12/2002 | Clare | 296/183.1 |
| 6,533,339 B1 * | 3/2003 | Bettin et al. | 296/37.1 |
| 6,543,829 B2 * | 4/2003 | Brown | 296/37.6 |
| 6,554,342 B1 * | 4/2003 | Burnett | 296/37.6 |
| 6,705,680 B2 * | 3/2004 | Bombardier | 298/17 R |
| 6,814,397 B2 * | 11/2004 | Henderson et al. | 296/184.1 |
| 6,941,654 B1 * | 9/2005 | Sears | 29/897.2 |
| 6,955,385 B1 * | 10/2005 | Boyer | 296/37.6 |
| 7,048,320 B2 * | 5/2006 | Rubel et al. | 296/37.6 |
| 7,104,583 B2 * | 9/2006 | Clare | 296/37.6 |
| 7,118,150 B2 * | 10/2006 | Bruford et al. | 296/37.1 |
| 7,219,941 B1 * | 5/2007 | San Paolo et al. | 296/37.6 |
| 7,431,368 B2 * | 10/2008 | Henderson et al. | 296/37.6 |
| 7,461,884 B2 * | 12/2008 | Clare et al. | 296/37.6 |
| 7,478,856 B1 * | 1/2009 | Ellis | 296/37.1 |
| 2001/0038218 A1 * | 11/2001 | Clare et al. | 296/37.6 |
| 2001/0038219 A1 * | 11/2001 | Clare et al. | 296/37.6 |
| 2001/0038230 A1 * | 11/2001 | Clare et al. | 296/189 |
| 2001/0050491 A1 * | 12/2001 | Clare et al. | 296/37.6 |
| 2003/0102685 A1 * | 6/2003 | Sioutis | 296/24.1 |
| 2004/0056499 A1 * | 3/2004 | McNally | 296/37.6 |
| 2005/0134070 A1 * | 6/2005 | Plentis et al. | 296/37.1 |
| 2006/0125269 A1 * | 6/2006 | Kunz | 296/37.1 |
| 2006/0219746 A1 * | 10/2006 | Kniffel et al. | 224/404 |
| 2008/0122240 A1 * | 5/2008 | Leroy et al. | 296/37.6 |
| 2008/0157556 A1 * | 7/2008 | Henderson et al. | 296/37.6 |
| 2008/0191506 A1 * | 8/2008 | Huotari et al. | 296/37.6 |
| 2008/0231066 A1 * | 9/2008 | Harrell | 296/37.6 |
| 2008/0284188 A1 * | 11/2008 | Redman et al. | 296/24.44 |
| 2008/0308591 A1 * | 12/2008 | Henderson et al. | 224/404 |
| 2008/0309108 A1 * | 12/2008 | Henderson et al. | 296/37.6 |
| 2009/0026786 A1 * | 1/2009 | Reich et al. | 296/37.6 |
| 2009/0045646 A1 * | 2/2009 | Clare et al. | 296/37.6 |

* cited by examiner

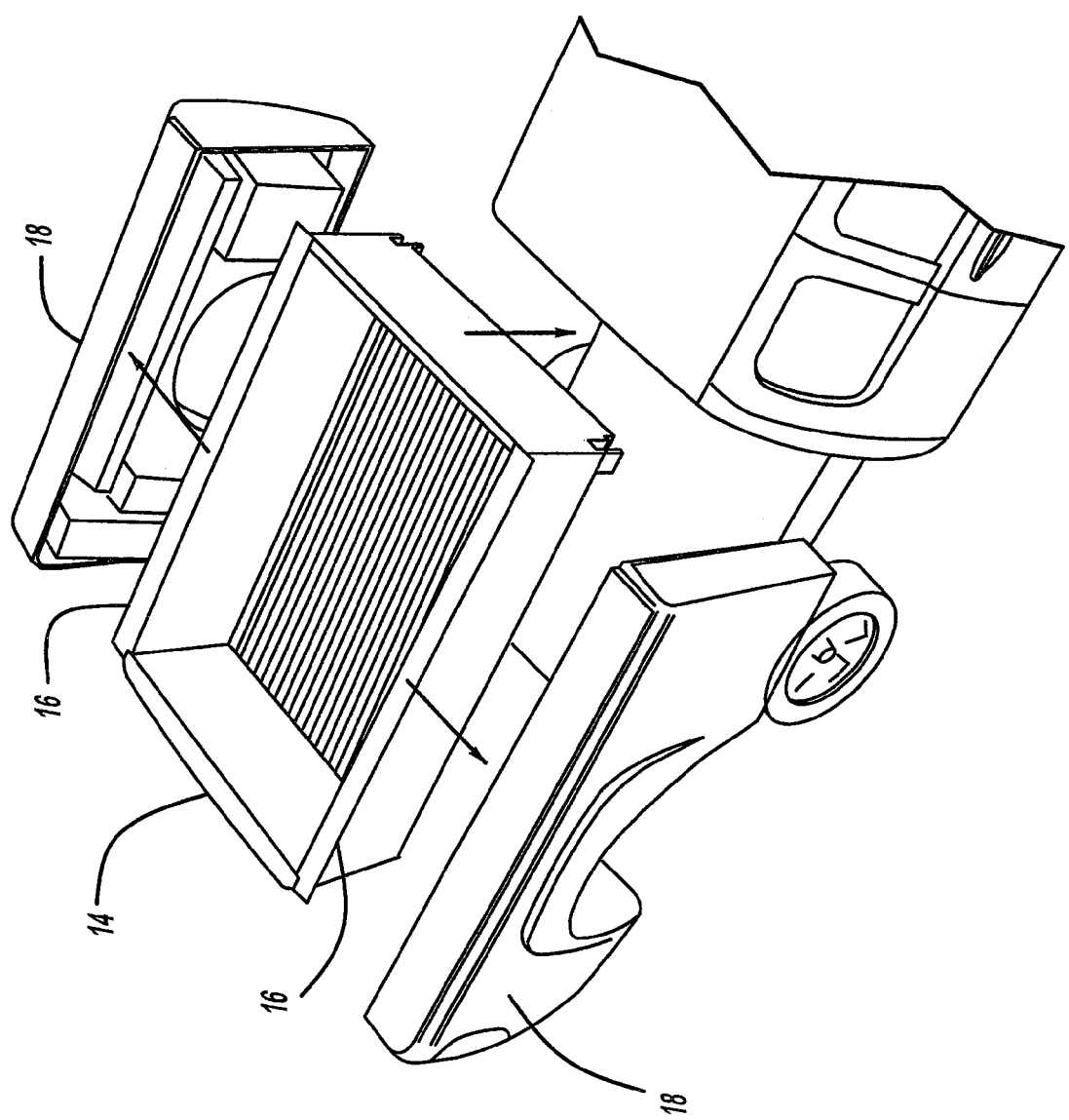

200
PICKUP BOX SIDE MODULE

CROSS-REFERENCE TO RELATED APPLICATIONS

This application claims the benefit of U.S. Provisional Application No. 60/798,093, filed May 5, 2006. The disclosure of the above application is incorporated herein by reference.

FIELD OF THE INVENTION

The present invention relates to a storage module integrated into a vehicle.

BACKGROUND OF THE INVENTION

Most vehicles have areas designed for storage, whether it is a trunk in a sedan or a truck bed in a pick-up truck. Additionally, storage areas can be added onto a motorized vehicle in order to give the user additional space to store objects or materials. For example, storage boxes can be mounted to the truck bed in order to give the user a defined storage area to store smaller objects such as tools. The storage boxes are typically mounted to the truck bed adjacent to a cab of the vehicle. These storage areas can also be mounted on top of the side walls of the truck bed. Thus, the storage areas are mounted to a box section that forms the top of the side walls. Typically, the box section has a greater width than the remaining portions of the side walls, which allow for the storage areas to be mounted to the side walls.

However, when these additional storage areas are mounted to the truck bed or the side walls of the truck bed, it can be difficult for the user to reach the objects in these storage areas. For example, when the storage boxes are mounted in the truck bed, the user has to get into the truck bed in order to access the storage areas. Likewise, when the storage areas are located on top of the side walls of the truck bed, the storage areas can be too high for some users due to the height of the vehicle in combination with the storage boxes being mounted on top of the side walls of the truck bed. In both scenarios, it is difficult for the user to get the objects out of the storage boxes, and often times the user must get into the truck bed to access the storage boxes.

Further, both scenarios require additional components to be added to the body of the vehicle. These additional manufacturing steps increase the cost of including storage areas on the vehicles. Further, securely fastening the storage area to the truck bed can be complex.

Therefore, it is desirable to develop a storage module that is integrated into the frame of a vehicle so that the storage compartment is integrated into the vehicle rather than having additional space added onto the vehicle for storage.

SUMMARY OF THE INVENTION

The present invention relates to a storage module having at least one exterior panel of a motorized vehicle, at least one door, and at least one inner panel. The door is at least partially formed by at least one of the exterior panels. At least one of the exterior panels and at least one of the interior panels define at least one area to form the storage module.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 5 is an exploded perspective view of a pickup truck showing the location of the storage modules in one embodiment of the invention.

DETAILED DESCRIPTION OF THE PREFERRED EMBODIMENTS

Figure 1:
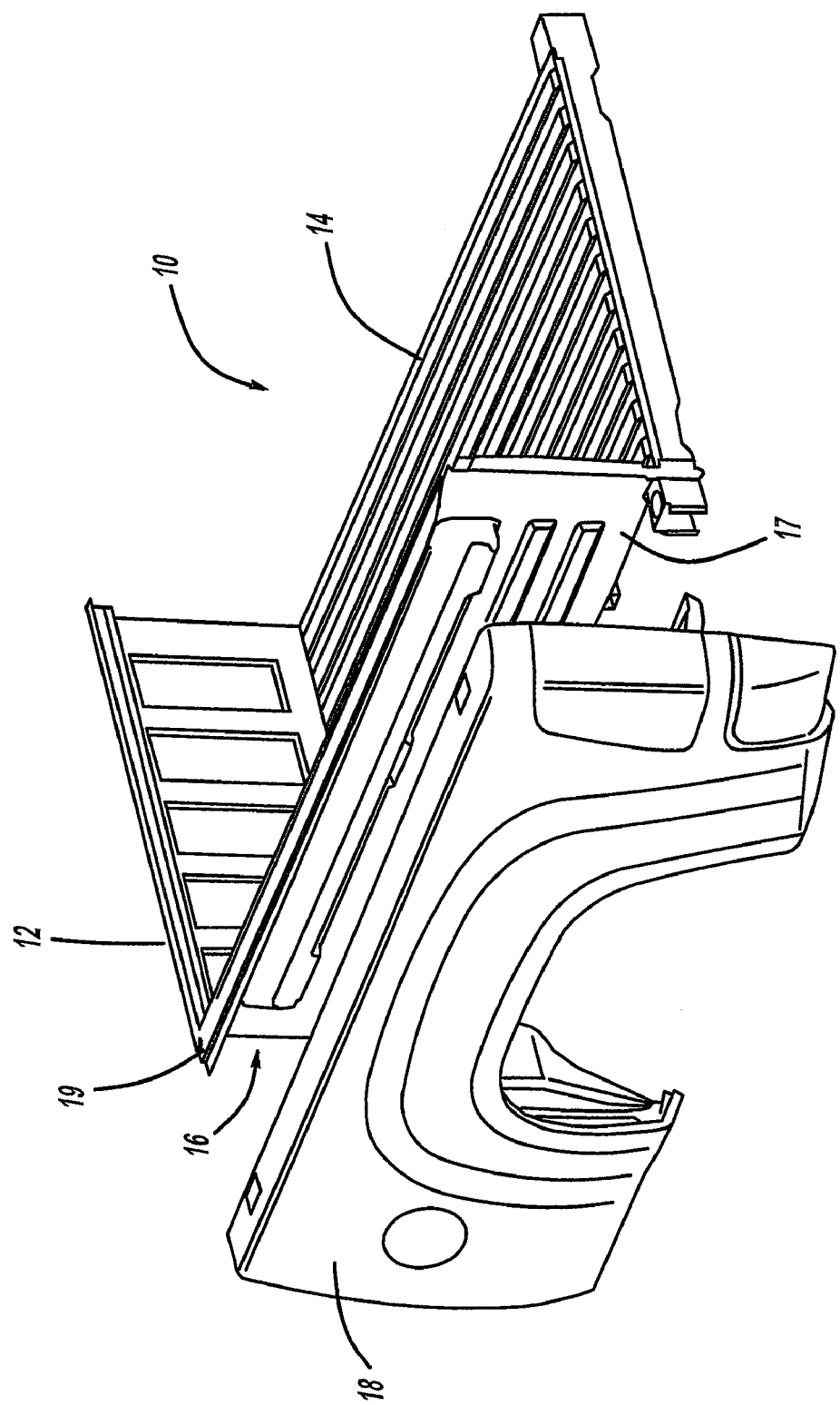
FIG. 1 is an exploded perspective view of a storage module in accordance with the present invention.

The following description of the preferred embodiment(s) is merely exemplary in nature and is in no way intended to limit the invention, its application, or uses.

Referring to FIGS. 1-5, a storage module is generally shown at 10. The storage module 10 is defined by components of a motorized vehicle generally indicated at 12. For example purposes only, and in no way limiting, the motorized vehicle is a truck with a truck bed 14 and with sides generally indicated at 16. While the figures depict the storage module 10 as being associated with a pickup truck exterior panel, it is within the scope of this invention for the storage module to be used on any type of vehicle or panel. For example the storage module 10 can be incorporated into the exterior panel of a sports utility vehicle, sedan, semi-truck, commercial truck, tow truck, recreational vehicles, camping trailers, and other vehicles such as golf cars, all-terrain vehicles, boats and motorcycles. Additionally, it is possible for the storage module 10 to be placed on an interior panel such as in the area of a trunk, interior door panel, dashboard or in the engine compartment for enhancing the usable engine area of the vehicle.

The sides 16 include a side wall 17, at least one exterior panel 18, a box section 19, and at least one compartment 20. The sides 16 have multiple doors, generally indicated at 22, operably connected to the sides 16. The doors 22 are at least partially formed by at least one exterior panel 18 and an inner panel or interior door panel 24 that are formed or attached together to form a hollow panel with the door 22 that is mounted to the sides 16. The exterior panel 18, as depicted in the figures, is located in the rear fender of the vehicle. However, the compartment 20 can be positioned anywhere in the fender outside of the vehicle wheel well. It is also within the scope of this invention for the exterior panel 18 to be other panels such as front fenders, door panels, etc.

The compartment 20 forms the interior boundaries of the storage area and holds the items that are to be stowed in the storage module 10. The compartment 20 can be formed of moulded plastic, metal or other suitable materials. Furthermore, the compartment 20 can have a different shape to suit the type of vehicle and location that the storage module 10 is being incorporated into. In another aspect of the invention, the compartment 20 can have removable or permanent shelves or other holders designed to hold specific items or smaller items. It should be appreciated that the compartment 20 does not have to be a continuous piece of material, but can be segmented and connected by a suitable fastener.

The compartment 20 has sides 27 that extend from a position generally adjacent to the exterior panel 18 giving the compartment 20 depth and forming an area 26. The area 26 can have different shapes and volumes to accommodate a variety of uses. Additionally the sides 27 can have vents or drains that allow for easier cleaning or for the storage of ice and perishable products that will need ventilation. In yet another alternate embodiment of the invention where the storage module is used on a recreational vehicle or camping trailer, the compartment 20 could form a sink or wash basin for holding water for cleaning purposes.

In a preferred embodiment, an aperture panel 28 is used to connect the compartment 20 to the exterior panel 18 and/or the inner door panel 24. The aperture panel 28 is preferably a continuous piece that extends around the openings of the area 26 formed by the door 22. Thus, the aperture panel 28 acts as a seal around the openings between the compartment 20 and the exterior panel 18 and/or the inner door panel 24. As an option the aperture panel 28 can have a piece of weather stripping material attached to make the seal between the aperture panel 28 and the inner panel 24 moisture resistant. Preferably, the door 22 is operably connected to the aperture panel 28 by one or more hinges 29 that provide a pivot axis for pivoting the door 22 about the one or more hinges 29. Typically, any suitable fastener is used to connect the one or more hinges 29 to the aperture panel 28 to the exterior panel 18, compartment 20, and/or the inner door panel 24. Examples of suitable fasteners include but are not limited to, a nut and bolt combination, rivets, screws, push-type fasteners or the like.

In a preferred embodiment, a portion of the compartment 20 forms the top of the truck bed sides 16, and a rail 30 extends along the compartment 20. The rail 30 is connected to the truck bed side 16 at a box section 19. In addition, the aperture panel 28 is connected to the rail 30. Fasteners 31 are used to connect the rail 30 to the compartment 20 and aperture panel 28. Preferably the rail 30 is the center piece that connects the compartment 20, the door 22, and the aperture panel 28 to the section 19 of the truck bed side 16.

Typically, the rail 30 can have additional features in order for additional components to be operably connected to the truck bed sides 16. For example, the rail 30 can have a first channel 32 extend substantially horizontally along the interior side of the truck bed sides 16. For example, the first channel 32 can then be used to accept a tie-down cleat to secure objects in the truck bed 14. Additionally, the rail 30 can have a second channel 34 which extends substantially horizontally along the exterior side of the truck bed sides 16. For example, the second channel 34 can be used to accept clips in order to secure a cover that extends over the truck bed 14. It should be appreciated that additional components can be integrated into the rail.

Figure 2A:
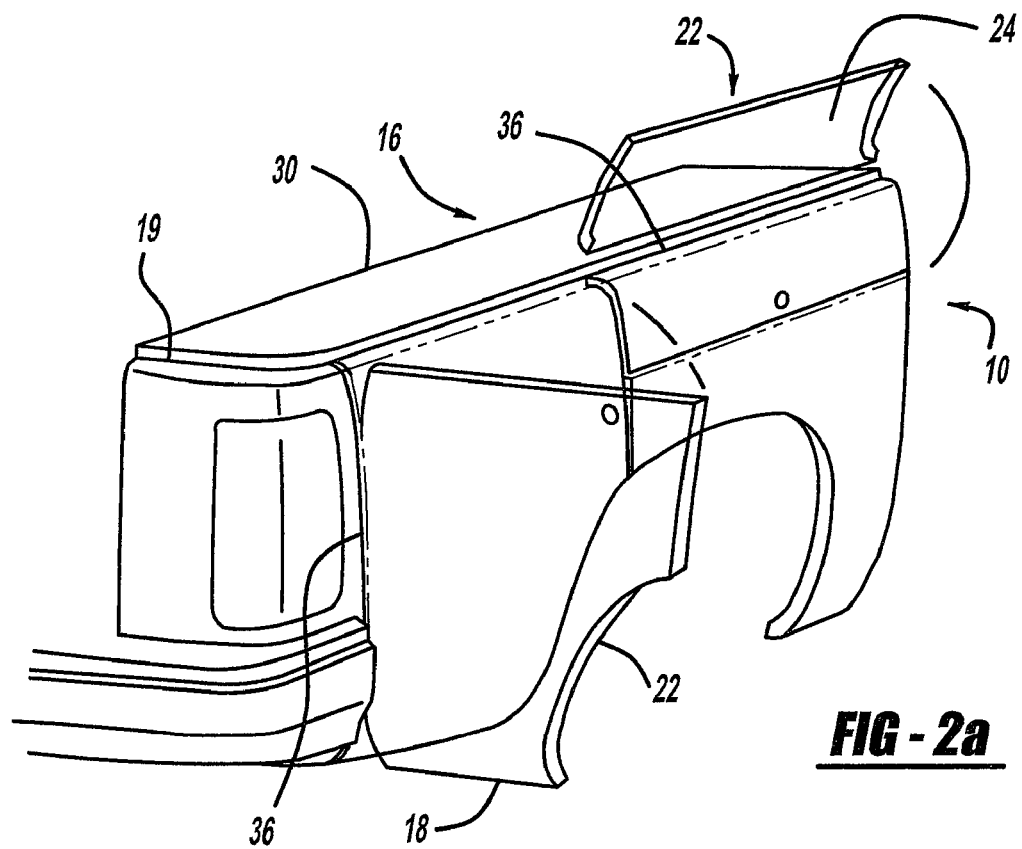
FIGS. 2*a*-2*c* are perspective views of the storage module having various door configurations.
Figure 2B:
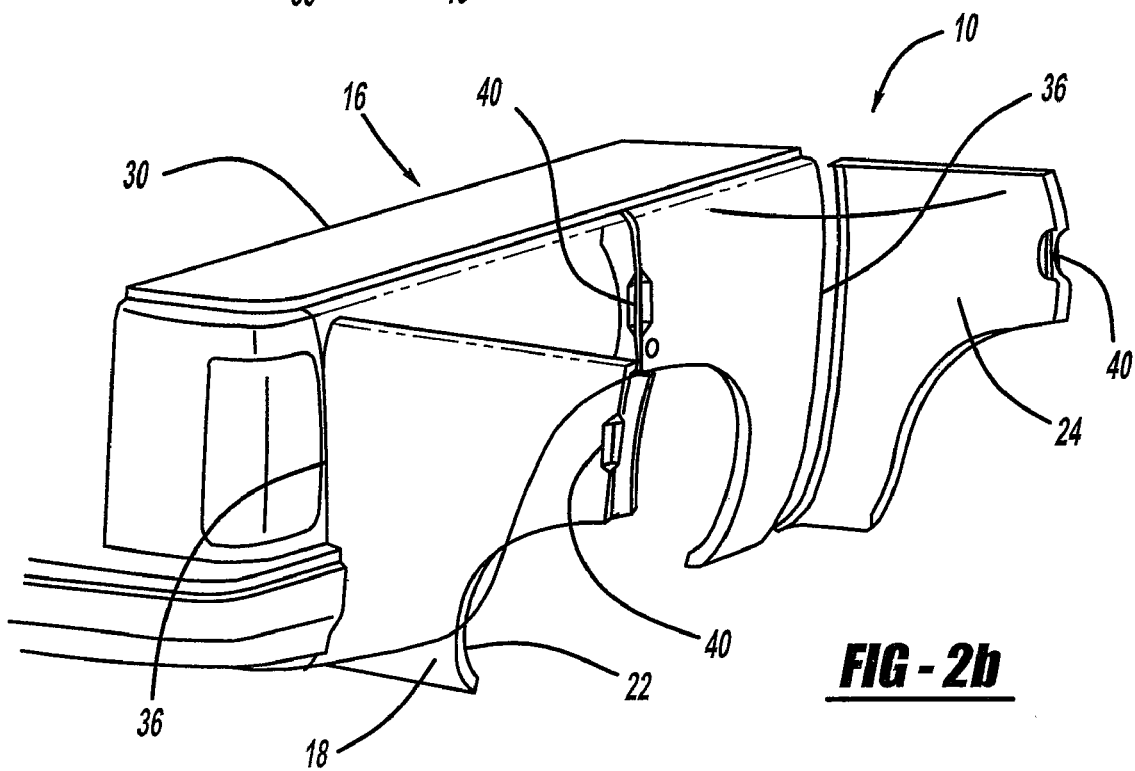
Figure 2C:
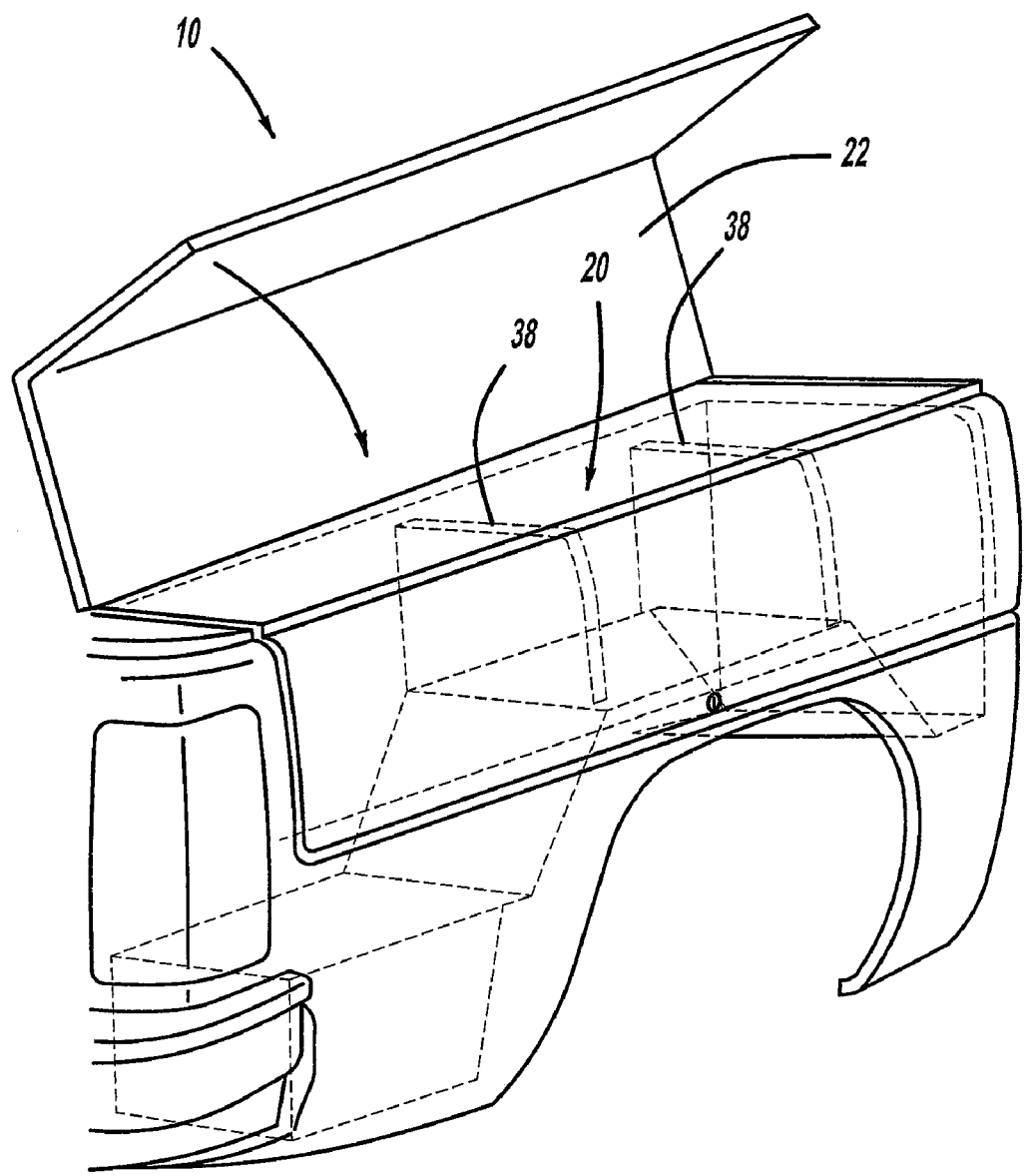
Figure 3:
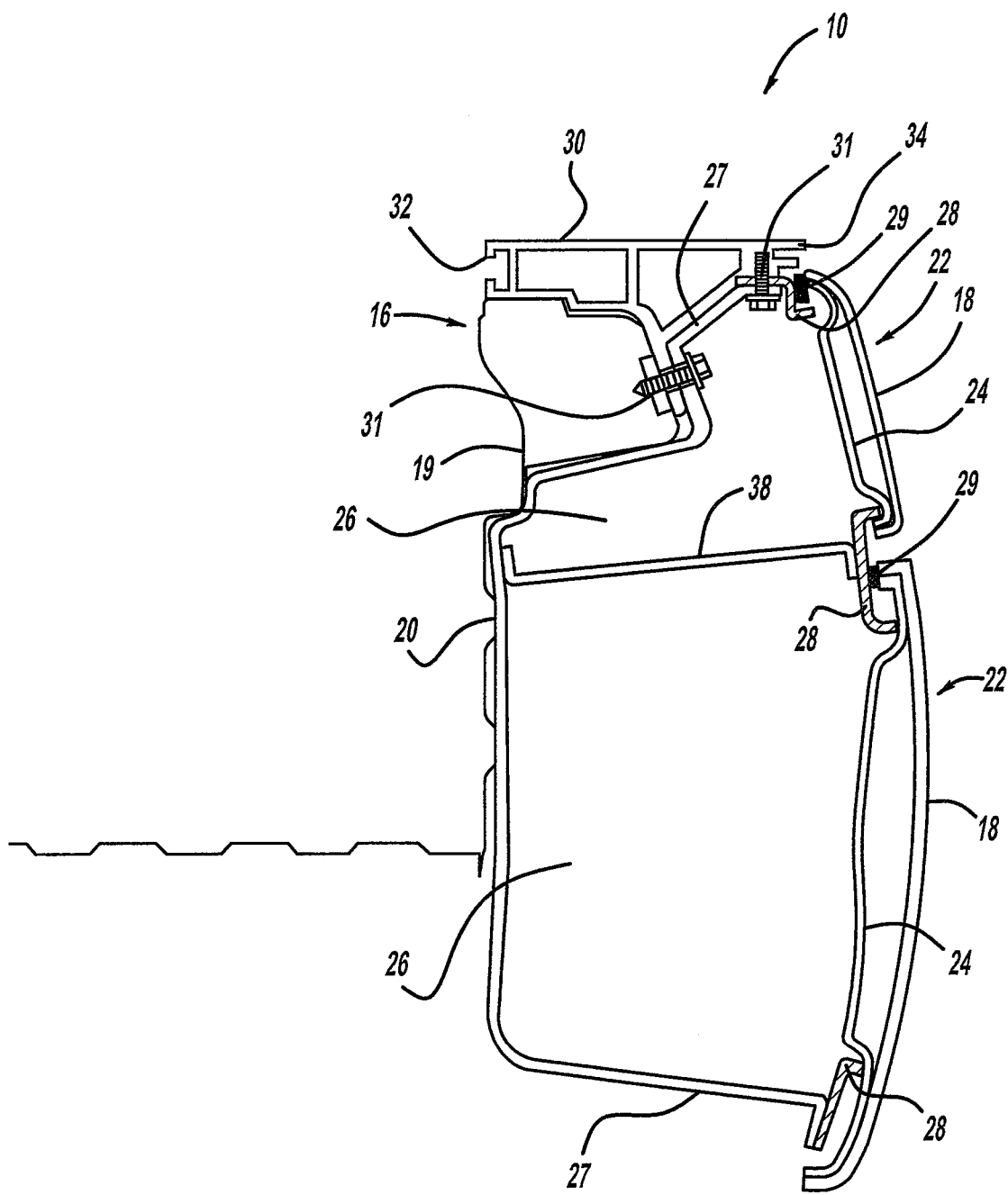
FIG. 3 is plan sectional side view of one embodiment of the storage module.

In reference to FIGS. 1 and 2a-2c, the doors 22 are operably connected to the sides 16 or compartment 20 along an axis 36 so that the doors 22 can rotate about the axis 36. Thus, as the doors 22 rotate about the axis 36, the doors open and close to give access to the area 26. Any suitable device can be used for creating the rotational or pivoting movement of the doors 22 about the axis 36, such as but not limited to, a hinge. FIGS. 2a-2c show alternate configurations for the doors 22 which can have various shapes and axis 36 for rotation. The axis 36 for the door 22 can extend in any predetermined direction. Thus, the axis can extend horizontally so that the one door 22 opens in a vertical motion, while the other door 22 open in a horizontal motion as shown in FIG. 2a. Similarly, the axis can extend vertically so that both doors 22 open in a horizontal motion as shown in FIG. 2b. In yet a third arrangement shown in FIG. 2c there is a single door that opens at the top of the side 16. It should be appreciated that the axis can extend in any predetermined direction, whether horizontal, vertical, or at an angle, and multiple axis 36 can be on the same storage module 10 for multiple doors 22 where the axis 36 extend in the same or different directions.

With specific reference to FIG. 2a, in one embodiment the storage module has two doors 22. The first door 22 has a vertical axis and moves in a horizontal motion from the center of the sides 16 towards the rear of the sides 16 when moving from a closed position to an open position. The second door 22 has a horizontal axis and moves in a vertical motion from the center of the sides 16 towards the top of the truck bed sides when moving from a closed position to an open position.

In reference to FIG. 2b, in another embodiment the storage module 10 has two doors 22 that are both on a vertical axis. Thus, the first door 22 moves in a horizontal motion from the center of the truck bed sides 16 to the rear of the truck bed sides 16, and the second door 22 moves in a horizontal motion from the center of the truck bed sides 16 to the front of the truck bed sides 16.

In reference to FIG. 2c, in another embodiment the storage module 10 has one door 22 that opens upward relative to the vehicle. The compartment 20 can be accessed by reaching down into the compartment 20. Shelves 38 are used for dividing the compartment 20 into various sections.

With continued reference to FIGS. 1-5, in a preferred embodiment, a shelf 38 extends across the compartment 20 toward the interior door panel 24. Typically, the shelf 38 is connected to the aperture panel 28. The shelf 38 can be used to divide the area 26 defined by the door 22 and compartment 20. In addition, the shelf 38 can divide areas 26 that are defined by multiple compartments 20 and multiple doors 22. Further, objects being stored in the area 26 can be placed on the shelf 38.

In a preferred embodiment, a latch 40 is used to secure the door 22 to the compartment 20 or aperture panel 28. Thus, the door 22 has a portion of the latch 40 connected to it, and a corresponding portion of the latch 40 is connected to the compartment 20 or aperture panel 28. Any suitable latching device can be used for the latch 40 in order to secure the door 22 to the compartment 20 or aperture panel 28 to prevent movement of the door 22 at undesirable times. In addition, a sugar scoop design, a latch 40 that is flush with the door 22, or the like, can be used on the exterior panel 18 in order to hide the portion of the latch 40 that is on the door 22 is provided.

In a preferred embodiment, the top rail 30 is made of an extruded aluminum, roll-formed steel, long glass fiber polypropylene (LGFPP) or the like. The inner door panel 24, aperture panel 28, shelf 38, and compartment 20 are made of structural LGFPP or the like. The exterior panel 18 is made from a thermoplastic polyolefin (TPO), polyurethane reactive injection mold (PUR RIM), GTX™ (GE material made of nylon polypropylene oxide), or the like.

The storage module 10 being integrated into the motorized vehicle 12 allows for the storage module 10 to be located in convenient locations for the user to access the storage module 10. Also, the integration of the storage module 10 into the motorized vehicle 12 is an efficient manufacturing process and less complex than adding additional storage onto the motorized vehicle 12 in a secondary manufacturing step.

Figure 4:
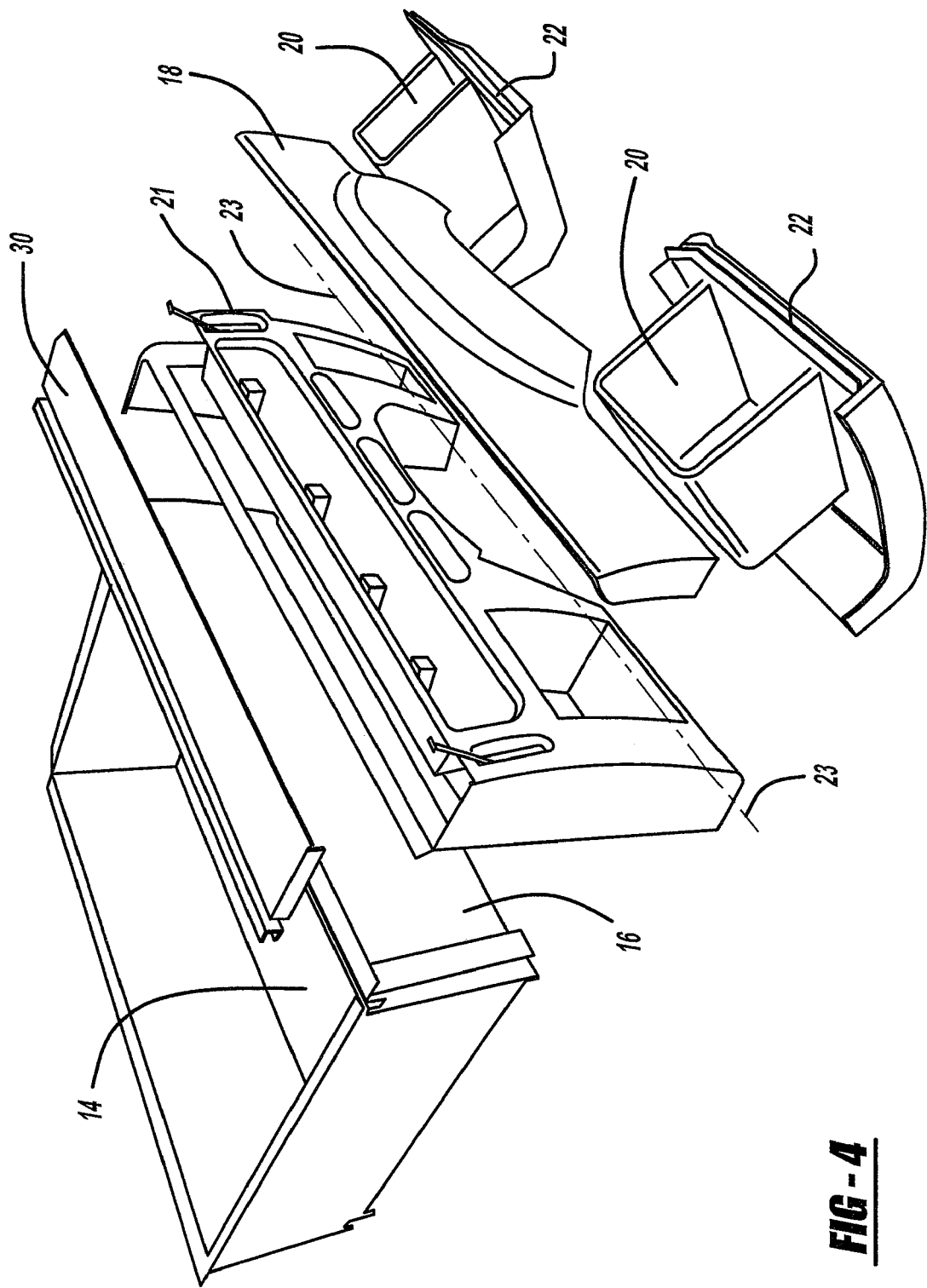
FIG. 4 is an exploded perspective view of the storage module in accordance with the one embodiment of the invention.

FIG. 4 depicts yet another alternate embodiment of the invention where each compartment 20 is integrally moulded or otherwise attached to form a bin type arrangement with the respective door 22. The door 22 and compartment are hingedly connected to a shell 21 module that forms a frame that connects to the side 16 of the bed 14. The shell 21 has apertures for receiving the compartments 20. The doors 22 are pivotally connected to the shell 21 to allow the compartment 20 and door 22 to rotate about an axis 23 when moved between an open and closed position.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A storage module integrated into a vehicle, said storage module comprising:
   at least one exterior panel of said vehicle;
   at least one door at least partially formed by said at least one exterior panel;
   at least one compartment, wherein said at least one exterior panel and said at least one compartment define at least one area and said at least one door allows access to said compartment;
   an aperture panel extending around an opening of said area and providing a connection between said at least one compartment and said at least one door; and
   a rail extending along said at least one compartment, wherein said at least one compartment, and said at least one aperture panel are connected to said rail and said rail is intermediate and operably connects said at least one aperture panel and said at least one compartment to a section of a vehicle bed side.

2. The storage module of claim 1 further comprising one or more hinges connecting said at least one door to said aperture panel, wherein said one or more hinges provide a pivot axis for pivoting said at least one door about said one or more hinges.

3. The storage module of claim 2, wherein said axis extends in at least one of a horizontal direction, vertical direction, and is an angle, such that said door moves in a corresponding direction to said axis.

4. The storage module of claim 1 further comprising at least one shelf in said at least one compartment, wherein said shelf can be removable or integral with said at least one compartment.

5. The storage module of claim 1 further comprising a portion of a latch connected to said at least one door and extending to an inner panel of said at least one door, wherein said latch is operable to releasably secure said at least one door to said at least one compartment when said at least one door is in a closed position.

6. The storage module of claim 1 wherein said at least one exterior panel is one selected from the group comprising a vehicle fender, door panel, golf car exterior panel, motorcycle body panel, recreational vehicle exterior body panel, interior of a vehicle trunk, interior of an engine compartment, or an all terrain vehicle exterior body panel.

7. The storage module of claim 1 wherein said rail further comprises a first channel that extends along the interior of the truck bed sides and a second channel that extends along the exterior of the truck bed sides, wherein said first channel and said second channel provide attachment points to the rail.

8. A storage module integrated into an exterior panel of a vehicle, said storage module comprising:
   a compartment having an area;
   an aperture panel defining an opening of said compartment;
   an exterior panel of said vehicle covering said aperture panel;
   at least one door at least partially formed by said in said exterior panel, wherein said at least one door is pivotally connected to said aperture panel to allow said at least one door to rotate with respect to said aperture panel and allow access to said area of said compartment, wherein said aperture panel provides a connection for said compartment; and
   a rail extending along said compartment, wherein said compartment and said aperture panel are connected to said rail and said rail is intermediate and operably connects said aperture panel and said compartment to a section of a vehicle bed side.

9. The storage module of claim 8 further comprising one or more hinges connecting said at least one door to said aperture panel, wherein said one or more hinges provide a pivot axis for said pivotal connection between said aperture panel and said at least one door.

10. The storage module of claim 9, wherein said axis extends in at least one of a horizontal direction, vertical direction, and is an angle, such that said door moves in a corresponding direction to said axis.

11. The storage module of claim 8 further comprising at least one shelf in said compartment, wherein said shelf can be removable or integral with said compartment.

12. The storage module of claim 8 further comprising a portion of a latch connected to said at least one door and extending to an inner panel of said at least one door, wherein said latch is operable to releasably secure said at least one door to said aperture panel when said at least one door is in a closed position covering said aperture panel and said compartment.

13. The storage module of claim 8 wherein said exterior panel is one selected from the group comprising a vehicle fender, door panel, golf car exterior panel, motorcycle body panel, recreational vehicle exterior body panel, interior of a vehicle trunk, interior of an engine compartment, or an all terrain vehicle exterior body panel.

14. The storage module of claim 8 wherein said rail further comprises a first channel that extends along the interior of the truck bed sides and a second channel that extends along the exterior of the truck bed sides, wherein said first channel and said second channel provide attachment points to the rail.

15. A storage module integrated into a fender of a vehicle, said storage module comprising:
   at least one compartment having an opening and an area, wherein said at least one compartment is placed on a side of a vehicle above the wheel well of a vehicle, forward the wheel well, rearward the wheel well or combinations thereof;
   said fender panel of said vehicle covering said compartment and said side of the vehicle;
   at least one door at least partially formed in said fender panel, wherein said at least one door is pivotally connected to said at least one compartment to allow said at least one door to pivot with respect to said at least one compartment and allow access to said area of said compartment;
   an aperture panel extending around an opening of said area and providing a connection between said at least one compartment and said at least one door; and
   a rail extending along said at least one compartment, wherein said at least one compartment and said at least one aperture panel are connected to said rail and said rail is intermediate and operably connects said at least one aperture panel and said at least one compartment to a section of a vehicle bed side.

16. The storage module of claim 15 further comprising one or more hinges connecting said at least one door to said aperture panel, wherein said one or more hinges provide a axis for said pivotal connection between said aperture panel and said at least one door.

17. The storage module of claim 16, wherein said axis extends in at least one of a horizontal direction, and is an angle, such that said door moves in a corresponding direction to said axis.

18. The storage module of claim 15 further comprising at least one shelf extending into said area of said at least one compartment, wherein said at least one shelf can be removable or integral with said at least one compartment.

19. The storage module of claim 15 further comprising a portion of a latch connected to said at least one door and extending to an inner panel of said at least one door, wherein said latch is operable to releasably secure said at least one door to said at least one compartment when said at least one door is in a closed position covering said aperture panel and said compartment.

20. The storage module of claim 15 wherein said rail further comprises a first channel that extends along the interior of the truck bed sides and a second channel that extends along the exterior of the truck bed sides, wherein said first channel and said second channel provide attachment points to the rail.

* * * * *